W. J. OVERMAN.
CONTROL FOR CAR CIRCUITS.
APPLICATION FILED JUNE 3, 1919.

1,362,346.

Patented Dec. 14, 1920.

Inventor:
William J. Overman,
by Albert G. Davis
His Attorney.

UNITED STATES PATENT OFFICE.

WILLIAM J. OVERMAN, OF BOSTON, MASSACHUSETTS, ASSIGNOR TO GENERAL ELECTRIC COMPANY, A CORPORATION OF NEW YORK.

CONTROL FOR CAR-CIRCUITS.

1,362,346.   Specification of Letters Patent.   Patented Dec. 14, 1920.

Application filed June 3, 1919. Serial No. 301,496.

*To all whom it may concern:*

Be it known that I, WILLIAM J. OVERMAN, a citizen of the United States, residing at Boston, in the county of Suffolk, State of Massachusetts, have invented certain new and useful Improvements in Control for Car-Circuits, of which the following is a specification.

My invention relates to the interlocking of control and other circuits on an electric car or train of cars whereby the proper circuit connections will be made automatically when the direction of operation of the car is reversed or when the car is connected or disconnected from other cars.

While my invention is applicable to a single car, it is particularly useful in connection with cars which may be operated in trains. When cars are coupled together or uncoupled from one another and the trolley poles or collectors are shifted to correspond with the desired direction of the cars, it is desired that as little as possible be left to the operator to do in the way of operating switches and making electrical connections.

One of the objects of my invention is to provide means whereby the necessary electrical connections for the control of auxiliary circuits on the car are made automatically in the performance of the usual coupling and uncoupling operations and the shifting of the trolley poles. Other objects and purposes of my invention will appear in the course of the following specification in which I have shown my invention embodied in concrete form for purposes of illustration.

Figure 1:
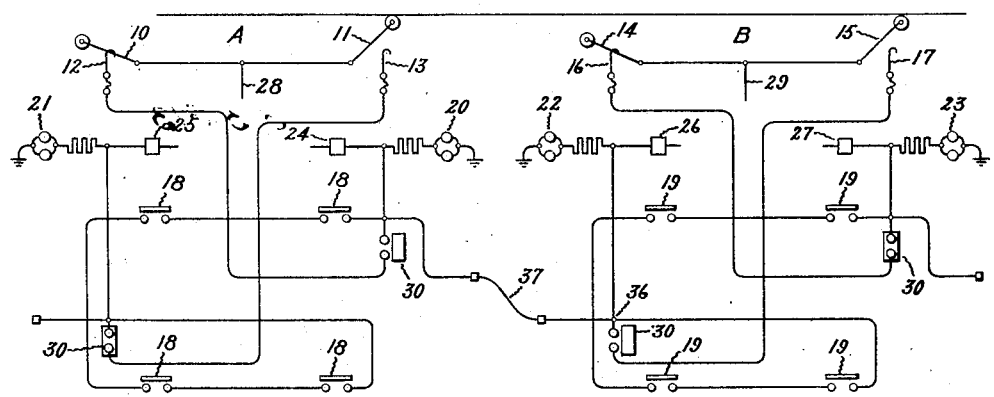
Figure 2:
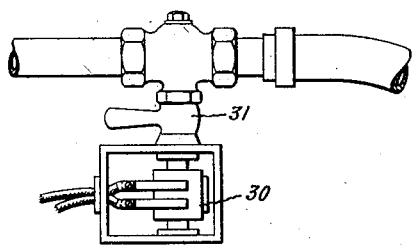
Figure 3:
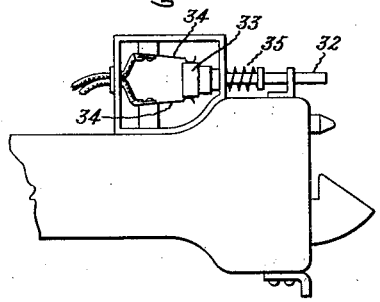

In the accompanying drawing illustrating my invention, Figure 1 is an illustrative diagram of the circuit connections; Fig. 2 shows a detail of the switch which is operated when the cars are coupled and uncoupled; and Fig. 3 is a modified arrangement of such switch.

Referring first to Fig. 1, it will be seen that I have illustrated my invention in connection with two cars A and B, each having two trolley poles or collectors, one for each direction of operation. The two trolley poles 10 and 11 of car A are arranged to be held in an inoperative position by hooks 12 and 13 respectively, and trolley poles 14 and 15 of car B are arranged to be similarly held by hooks 16 and 17. These hooks make electrical connection with their respective trolley poles so that current will be carried through them as hereinafter described.

I have shown each car as having control circuits including door switches 18 and 19, signal lights 20, 21 22 and 23 and control circuits 24, 25, 26 and 27. The main motor circuit is through conductors 28 and 29. At each end of each car is a switch which I have designated 30. This switch is for connecting the trolley pole with the control circuits and is adapted to be operated when a car is coupled to or uncoupled from that end of the car at which the switch is located. In Fig. 2 I have shown, for purposes of illustration, this switch as being operated when the handle 31 of the air valve is operated, which must of course be done when the cars are connected and disconnected. In Fig. 3 I have shown a switch which is operated automatically when the cars are coupled or uncoupled, this being accomplished by a plunger 32 which is automatically operated to move the switch member 33 out of engagement with the contacts 34 when the car is coupled. When the cars are uncoupled the spring 35 moves the switch member back into engagement with the contacts 34.

The arrangement of circuits and mode of operation are as follows: In Fig. 1 I have shown the two cars A and B coupled together, the rear trolley poles of both cars being up in the usual way so that the cars will move to the left as shown in the drawing. It will be understood that the switches 30 are opened when a car is coupled to the end at which the switch is located, and are closed when the car is uncoupled. The circuit connections will now be as follows: From the trolley pole 15 of car B through the trolley pole 14 in its inoperative position, through the hook 16, thence through the switch 30 at the rear end of car B, and thence through door switches 19 to the point 36. At this point the circuit divides, one branch going to the signal lamps 22 and the control circuits 26 while the other branch goes through the coupler socket indicated at 37 to the car A where it passes through the door switches 18, the signal lamps 21 and the control circuits 25 as before. It will be noted that since the switch 30 is open the trolley pole 11 of car A is disconnected from the circuits on car A although of course the motor circuit at 28 is connected. Assume now that the car A is to operate alone and the car B is, therefore, disconnected from it. The circuit will now be: from trolley pole 11 through the trolley hook 12, thence through the switch 30 which has been closed by the cutting off of the air incident to the uncoupling of the cars, thence through the door switches and other circuits as above described. Similarly car B may now be operated independently since the switch 30 at the forward end has also been closed at the uncoupling of the cars. If now it is desired to operate car A alone, for instance, in the opposite direction the trolley pole 10 will be raised and the trolley pole 11 lowered and held in an inoperative position by the hook 13. The circuit will now be automatically made from the trolley pole 10 to trolley pole 11 and hook 13, thence to switch 30 at the forward end of car A, and thence through the car circuits as before. Likewise if the two cars coupled together as shown in Fig. 1 are to be operated in the opposite direction the connection to the car circuit will be from the rear car as before, which in this case will be from trolley pole 10 to trolley pole 11 and hook 13, thence through the circuits on the car A and through coupler sockets 37 to car B.

It will be noted by this arrangement the proper circuits are automatically made by the performance of the ordinary operations of coupling and uncoupling the cars and changing the trolley poles. No additional circuit connections are left for the operator to make. Cars may be operated either singly or in multiple and in either direction without making any change in the car circuits.

While I have described my invention as embodied in concrete form and as operating in a specific manner in accordance with the provisions of the patent statutes, it should be understood that I do not limit my invention thereto as various modifications thereof will suggest themselves to those skilled in the art without departing from the spirit of my invention the scope of which is set forth in the annexed claims.

What I claim as new and desire to secure by Letters Patent of the United States, is:—

1. The combination with an electric car having a current collector at each end, and means for holding said collectors in inoperative positions, of a switch at each end adapted for operation by the coupling or uncoupling of a car, and means for completing a circuit to a switch at one end through a collector when the latter is held in inoperative position.

2. The combination with an electric car having a current collector at each end, and means for holding said collectors in inoperative positions, of a switch at each end adapted for operation by the coupling or uncoupling of a car, and means for completing a circuit to a switch at one end through the collector at the other end when the latter is held in inoperative position.

3. The combination with an electric car having a current collector at each end and means for holding said collectors in inoperative position, of a switch at each end adapted for operation by the coupling or uncoupling of a car, and a circuit connection to each switch from one current collector through the other collector when the latter is in inoperative position.

4. The combination with an electric car having a trolley pole at each end and a hook for holding each pole in inoperative position, of a switch at each end adapted for operation by the coupling or uncoupling of a car, and a circuit connection from each hook to one of said switches.

5. The combination with an electric car provided with a current collector, a control circuit on said car, a switch at each end for connecting the control circuit to the collector and means for operating each switch by the coupling of another car to disconnect the control circuit from the collector and connect it with said next car.

6. The combination with an electric car having a current collector at each end and means for holding said collectors in inoperative position, a control circuit on said car, a switch at each end connected to one collector through the other collector in its inoperative position and means for operating each switch by the coupling of another car to disconnect the control circuit from the collectors and connect it with said next car.

In witness whereof, I have hereunto set my hand this 28th day of May, 1919.

WILLIAM J. OVERMAN.